US012365106B2

(12) United States Patent
Plichon et al.

(10) Patent No.: US 12,365,106 B2
(45) Date of Patent: Jul. 22, 2025

(54) COMBINATION OF A SHEATH AND A KNIFE

(71) Applicant: SEB S.A., Ecully (FR)

(72) Inventors: Stéphane Plichon, Allonzier-la-Caille (FR); Stéphane Suchet, Marcellaz-Albanais (FR)

(73) Assignee: SEB S.A. (FR)

( * ) Notice: Subject to any disclaimer, the term of this patent is extended or adjusted under 35 U.S.C. 154(b) by 405 days.

(21) Appl. No.: 17/918,600

(22) PCT Filed: Mar. 5, 2021

(86) PCT No.: PCT/EP2021/055687
§ 371 (c)(1),
(2) Date: Oct. 13, 2022

(87) PCT Pub. No.: WO2021/209196
PCT Pub. Date: Oct. 21, 2021

(65) Prior Publication Data

US 2023/0147749 A1 May 11, 2023

(30) Foreign Application Priority Data

Apr. 14, 2020 (FR) ....................................... 2003710

(51) Int. Cl.
*B26B 29/02* (2006.01)
*B24B 3/54* (2006.01)

(52) U.S. Cl.
CPC .............. *B26B 29/025* (2013.01); *B24B 3/54* (2013.01)

(58) Field of Classification Search
None
See application file for complete search history.

(56) References Cited

U.S. PATENT DOCUMENTS 3,676,961 A 7/1972 Jackson
3,774,350 A * 11/1973 Bayly .................. B26B 29/025 451/555
3,861,246 A 1/1975 Waller
4,041,651 A 8/1977 Bayly
4,117,748 A 10/1978 Watts
4,805,350 A 2/1989 Farrer
5,245,756 A 9/1993 Howell et al.
(Continued)

FOREIGN PATENT DOCUMENTS

CA 1046774 A 1/1979
CN 115397618 A 11/2022
(Continued)

OTHER PUBLICATIONS

International Search Report for PCT/EP2021/055687 mailed May 31, 2021. 3 pgs.
(Continued)

*Primary Examiner* — Hwei-Siu C Payer
(74) *Attorney, Agent, or Firm* — Lerner David LLP

(57) ABSTRACT

A combination of a sharpening sheath and a knife comprising a blade intended to be stored in the sheath, wherein the sheath comprises a cavity intended to receive the blade and an access opening at one of the ends of the cavity, the sheath comprising, in the lower part thereof, a device for receiving the cutting edge of the blade, characterized in that the sheath comprises, in the upper part thereof, a locking element cooperating with a safety element provided on the back of the blade in order to longitudinally immobilize the knife in the sheath and in that the device for receiving the cutting edge of the blade is borne by an arm rotatably mounted in the sheath, the sheath comprising biasing means acting on the arm to bring the receiving device of the cutting edge of the blade towards the locking element.

11 Claims, 6 Drawing Sheets

(56) References Cited

U.S. PATENT DOCUMENTS

| | | | | |
|---|---|---|---|---|
| 5,442,855 | A | 8/1995 | Jobin | |
| 5,784,786 | A | 7/1998 | Williams | |
| 6,117,002 | A | 9/2000 | Stokes et al. | |
| 6,224,475 | B1 | 5/2001 | May et al. | |
| 6,427,333 | B1 | 8/2002 | Veltz et al. | |
| 9,033,148 | B2 | 5/2015 | Adams | |
| 10,589,436 | B1 | 3/2020 | Panosian et al. | |
| 2012/0180602 | A1 | 7/2012 | Murphy et al. | |
| 2013/0026054 | A1 | 1/2013 | Adams | |
| 2015/0031274 | A1 | 1/2015 | Beechinor et al. | |
| 2018/0207827 | A1 | 7/2018 | Hsieh | |
| 2019/0351570 | A1 | 11/2019 | Siffermann | |
| 2023/0140211 | A1* | 5/2023 | Plichon | B24D 15/084 451/555 |
| 2023/0147749 | A1* | 5/2023 | Plichon | B24B 3/54 30/138 |

FOREIGN PATENT DOCUMENTS

| | | | |
|---|---|---|---|
| CO | 20200003945 | | 9/2020 |
| EP | 0634252 | A1 | 1/1995 |
| EP | 0665086 | A1 | 8/1995 |
| FR | 2223140 | A1 | 10/1974 |
| FR | 2333614 | A1 | 7/1977 |
| FR | 2715340 | A1 | 7/1995 |
| GB | 1332598 | A | 10/1973 |
| GB | 1532548 | A | 11/1978 |
| JP | S5238695 | A | 3/1977 |
| JP | S5292994 | A | 8/1977 |
| JP | S5315695 | A | 2/1978 |
| JP | S59151985 | A | 8/1984 |
| JP | S6243574 | U | 3/1987 |
| JP | S6376260 | U | 5/1988 |
| JP | 2000167271 | A | 6/2000 |
| JP | 2003524528 | A | 8/2003 |
| TW | 506325 | U | 10/2002 |

OTHER PUBLICATIONS

Colombian Office Action for Application No. NC2022/0013862, dated May 8, 2024, pp. 1-2.

Search Report dated Dec. 13, 2023 from the Office Action for Chinese Application No. 202180028153.5 Issued Dec. 15, 2023, pp. 1-3.

* cited by examiner

[Fig 1]
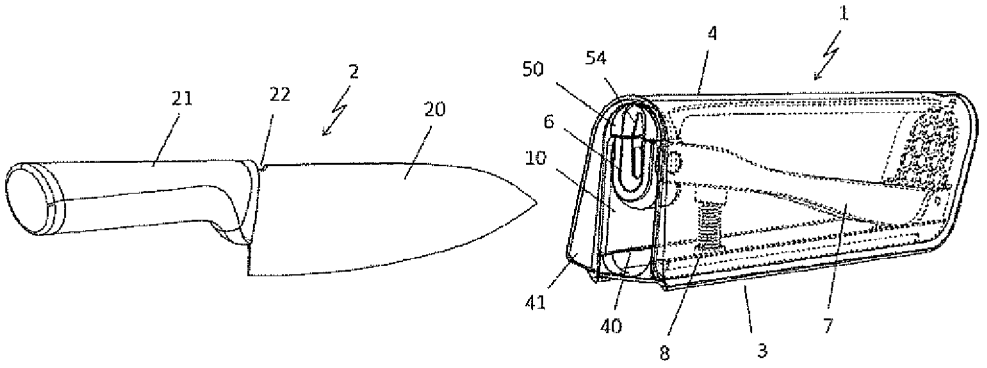
[Fig 2]
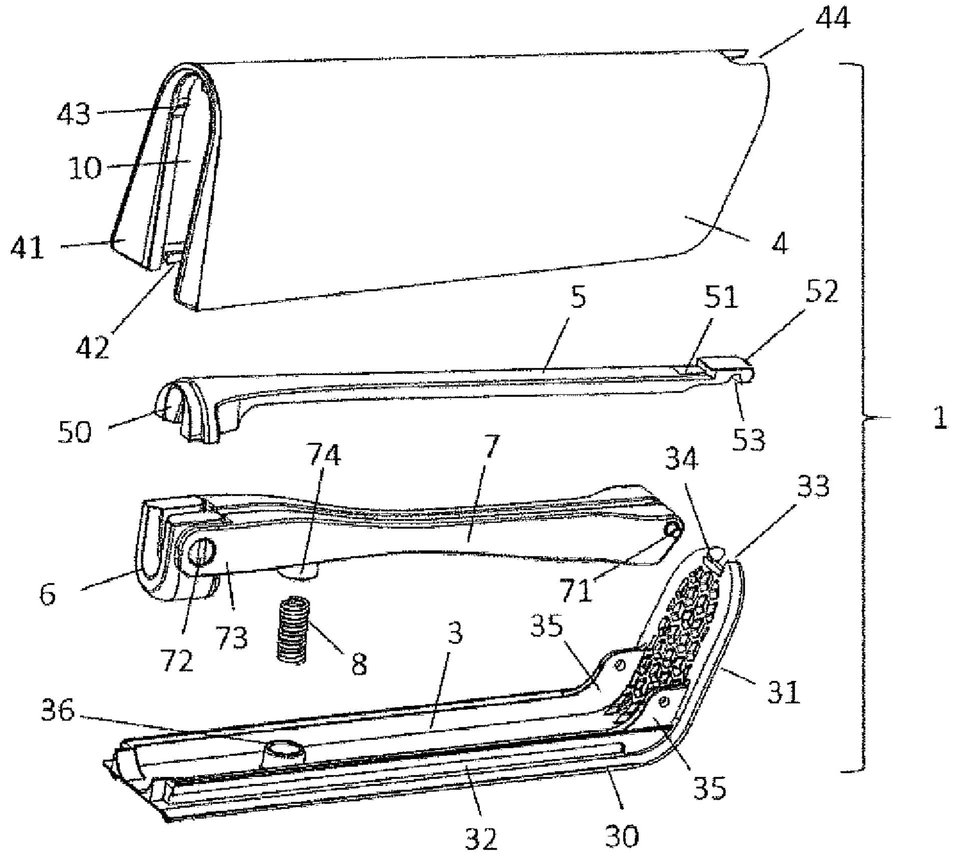

[Fig 3]
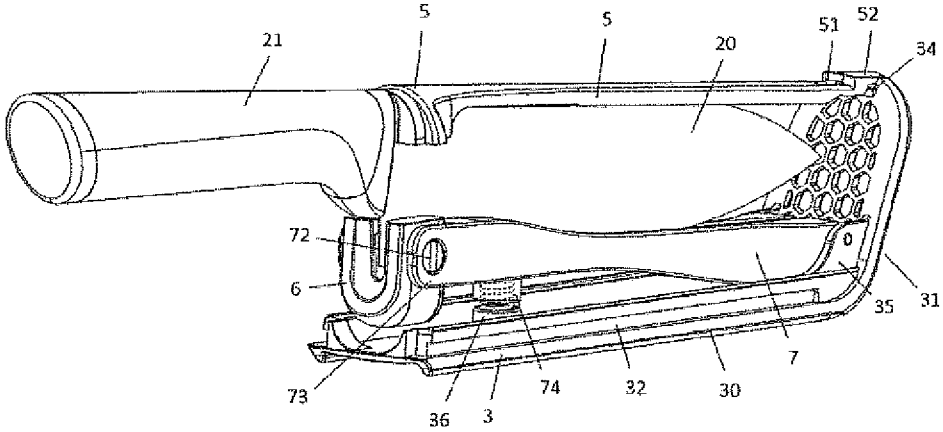
[Fig 4]
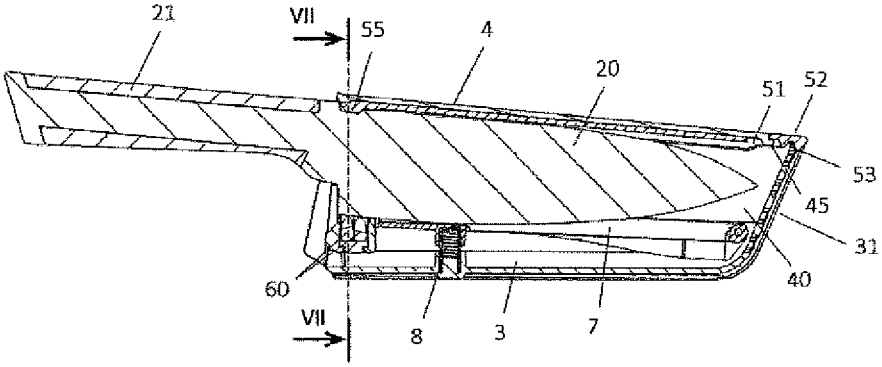
[Fig 5]
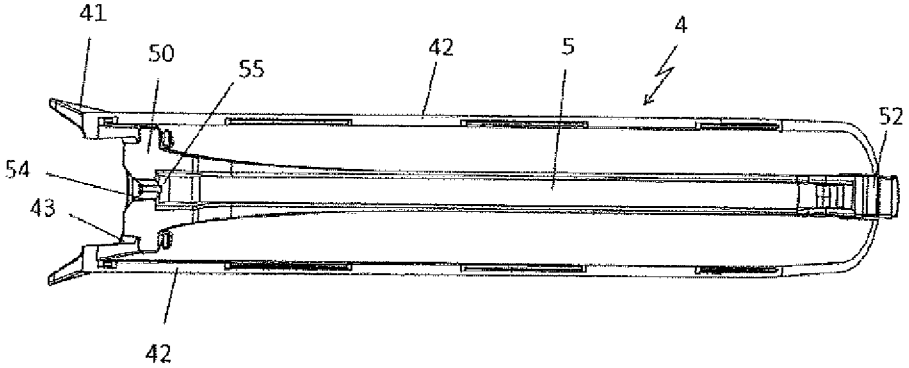

[Fig 6]
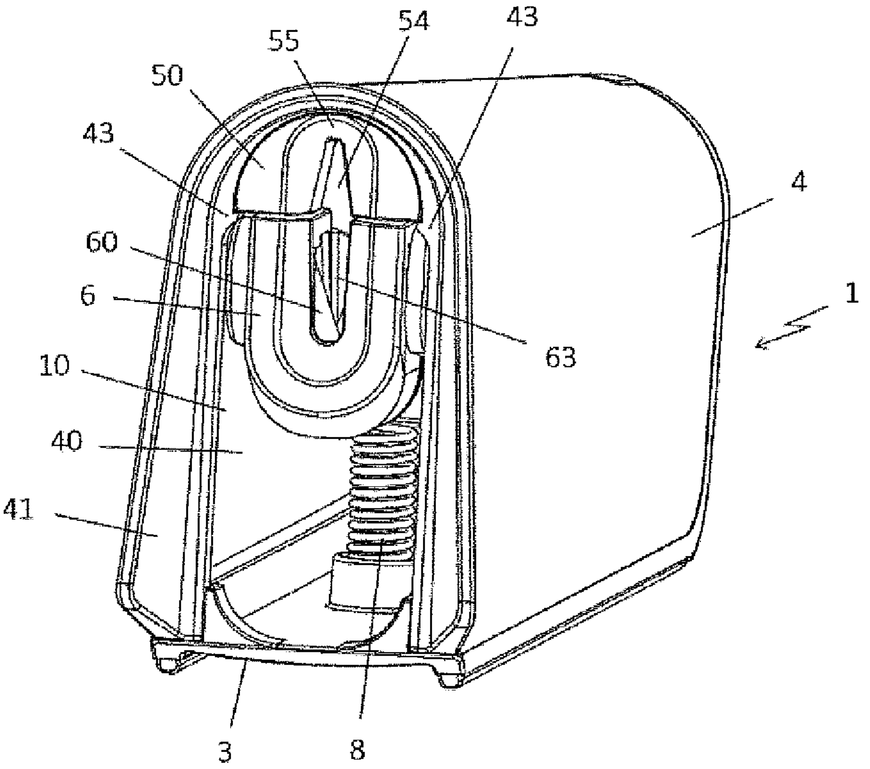

[Fig 7]
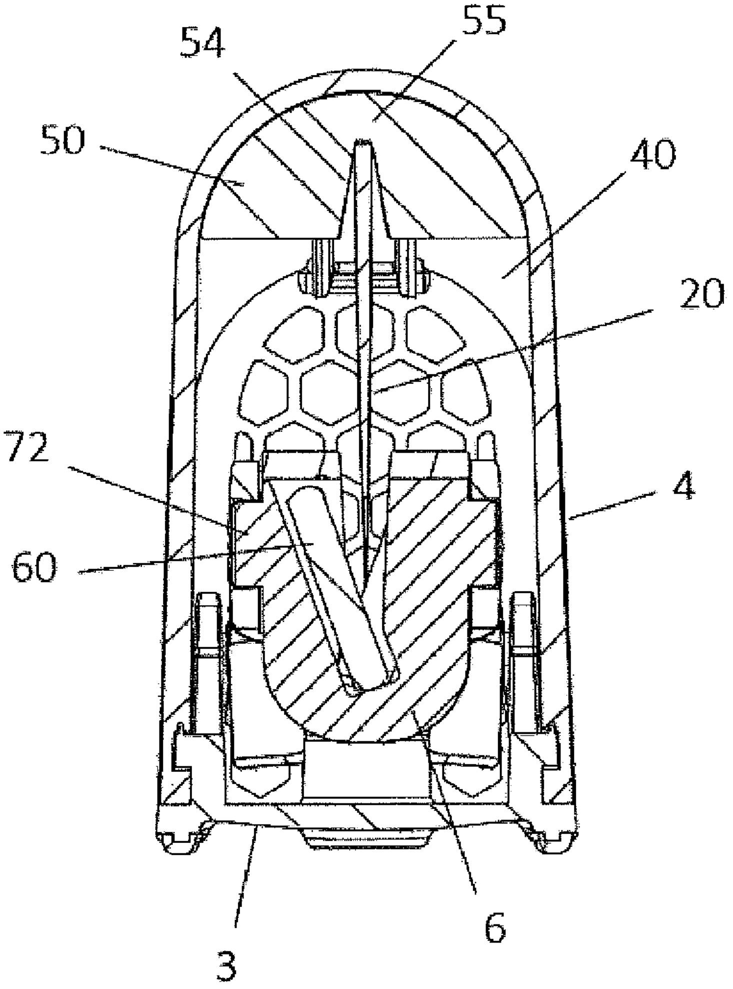

[Fig 8]
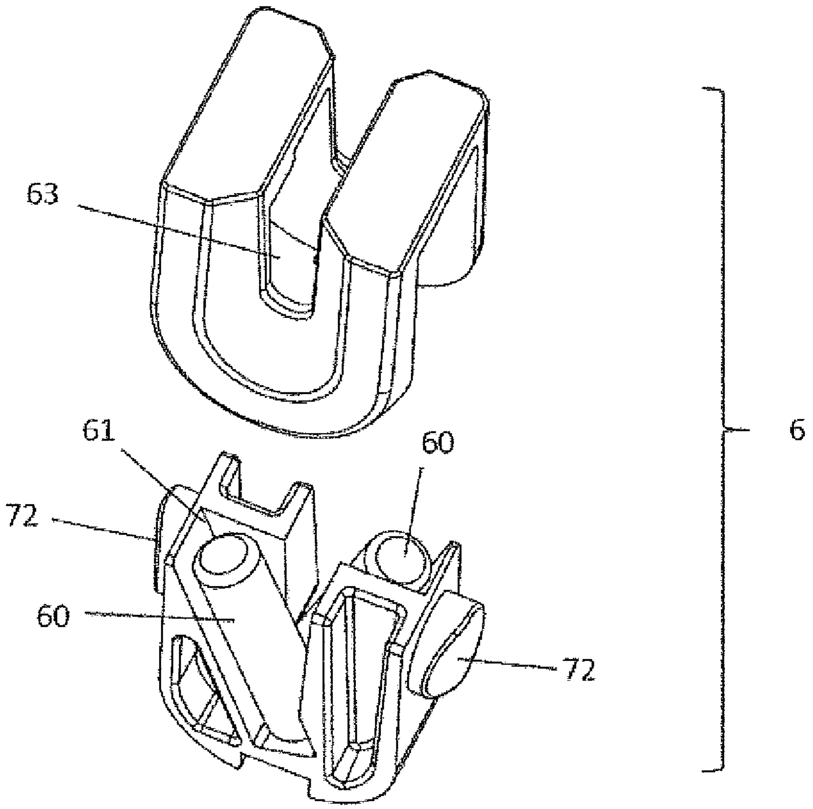

[Fig 9]
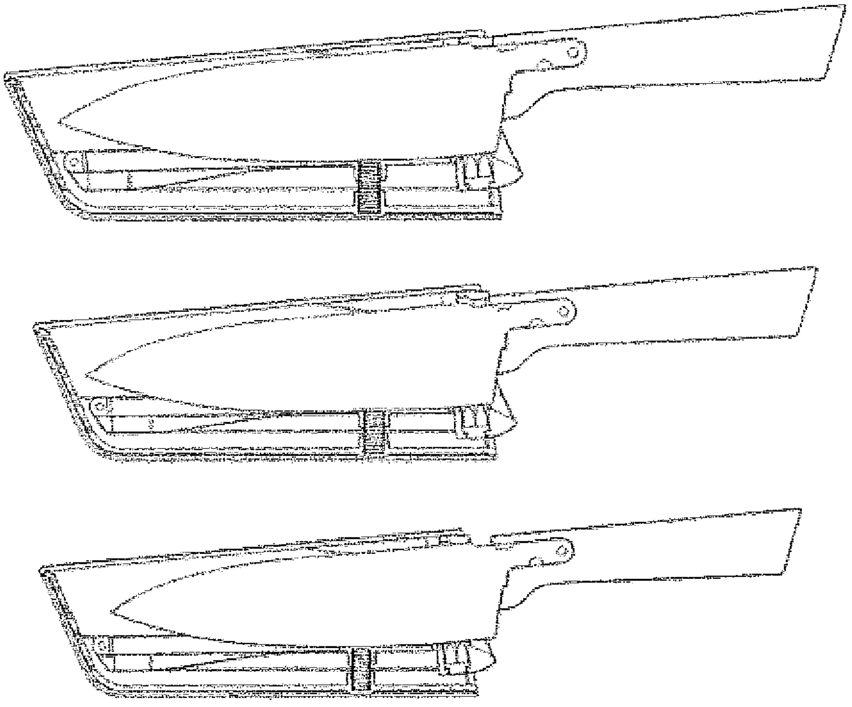
9 a
9 b
9 c
[Fig 10]
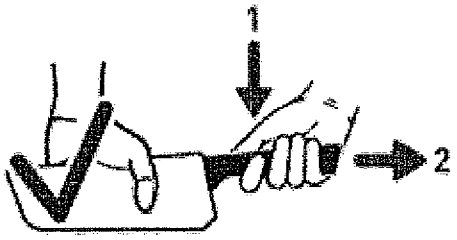

COMBINATION OF A SHEATH AND A KNIFE

CROSS-REFERENCE TO RELATED APPLICATIONS

The present application is a national phase entry under 35 U.S.C. § 371 of International Application No. PCT/EP2021/055687 filed Mar. 5, 2021, which claims priority from French Application No. 2003710 filed on Apr. 14, 2020, all of which are incorporated herein by reference.

TECHNICAL FIELD

The present invention relates to the combination of a sheath and a knife comprising a blade intended to be stored in the sheath.

STATE OF THE ART

Known from document FR2715340 is a combination of a sharpening sheath and a knife equipped with a safety device enabling the knife to be immobilized in the sheath in order to prevent it from being accidentally dropped.

However, such a device has the disadvantage of including a safety device that is not very ergonomic because the user must use both hands to unlock the knife. In fact, the safety lock is arranged in the most fragile part of the knife, namely at the cutting edge of the blade which weakens it. Added to this is the fact that a safety lock in the weakest portion of the part is difficult at the industrial level and therefore more difficult to produce at the factory, since the cutting edge is a critical part of the knife. In addition, this may disturb the sharpening because the safety lock may hinder the movement of the blade during its sharpening.

SUMMARY OF THE INVENTION

The present invention is intended to remedy this disadvantage.

The technical problem on which the invention is based consists of proposing a combination of a sheath and a knife wherein the sheath is equipped with a safety device, ensuring an immobilization of the knife, which is ergonomic to use. Another purpose of the invention is to propose a combination of a sheath and a knife that is simple and ergonomic to produce.

To that end, an object of the invention is a combination of a sheath and a knife comprising a blade intended to be stored in the sheath, wherein the sheath comprises a cavity intended to receive the blade and an access opening at one of the ends of the cavity, the sheath comprising, in the lower part thereof, a device for receiving the cutting edge of the blade, characterized in that the sheath comprises, in the upper part thereof, a locking element cooperating with a safety element made on the back of the blade to longitudinally immobilize the knife in the sheath and in that the receiving device of the cutting edge of the blade is borne by an arm rotatably mounted in the sheath, the sheath comprising biasing means acting on the arm to bring the receiving device of the cutting edge of the blade towards the locking element.

Such a locking device has the advantage of ensuring the immobilization of the knife in the sheath and to prevent it from being accidentally dropped, particularly during transport of the sheath.

In addition, such a locking device has the advantage of achieving good ergonomics of use, the locking of the knife being produced automatically under the effect of the thrust exerted by the biasing means when the safety element arrives at the height of the locking element during insertion of the knife into the sheath. The unlocking of the knife is also performed very ergonomically, by exerting a downward pressure on the handle of the knife to disengage the locking element from the safety element of the back of the blade, then by exerting a pulling force on the back of the blade.

Another advantage of the invention is that the locking device makes it possible to maintain the knife secure in the sheath during handling of the combination according to the invention; thus, a user grasping the assembly by the handle of the knife will not have the sheath be separated from the knife and vice versa.

Another advantage of the invention is that the locking mechanism of the knife is manipulated with the hands of the user placed on the side of the non-cutting edge of the knife, whether to engage the mechanism or disengage the mechanism. The user's hands are advantageously arranged on the opposite side of the cutting edge, the support being provided on the noncutting side. Contrary to known safety systems, the hand must be placed beneath the handle of the knife, blade side of the knife, in order to disengage the safety, with a risk of becoming injured.

The appliance may also have one or more of the following features, taken alone or in combination.

According to one advantageous feature of the invention, the locking element and safety indentation are arranged such that the locking element is engaged in the safety element and immobilizes the knife in a storage position in which the entire blade is inserted into the sheath.

Such a feature has the advantage of providing great safety of use by immobilizing the knife in a position in which the blade is concealed by the sheath and is therefore not accessible to the user.

According to an advantageous feature of the invention, the safety member consists of an indentation.

According to an advantageous feature of the invention, the sheath comprises a guiding device for the back of the blade advantageously arranged in the vicinity of the access opening.

Such a feature makes it possible to guide the back of the blade so as to facilitate the engagement of the locking element in the safety member.

According to an advantageous feature of the invention, the guide device comprises a notch for receiving the back of the blade and the locking element is formed by the bottom of the notch.

Such a feature has the advantage of ensuring, with the same element, the transverse guiding of the blade and the longitudinal locking thereof.

According to an advantageous feature of the invention, the receiving notch of the back of the blade is V-shaped.

Such a feature has the advantage of ensuring excellent guiding of the back of the blade into the sheath.

According to an advantageous feature of the invention, the receiving device of the cutting edge of the blade is formed by a sharpening device.

Such a feature enables the blade to be sharpened automatically during its insertion and/or extraction from the sheath.

According to an advantageous feature of the invention, the sharpening device is rotatably mounted on the arm.

Such mobility of the sharpening device at the end of the arm enables the sharpening device to follow the curvature of the blade so as always to be positioned with the same angle of attack relative to the cutting edge of the blade, such that the sharpening of the blade is optimized irrespective of the curvature thereof.

According to an advantageous feature of the invention, the sharpening device comprises two sharpening elements arranged as a V.

Such a feature allows a balanced sharpening on both sides of the blade.

According to an advantageous feature of the invention, both sharpening elements are arranged in two offset planes parallel to one another and perpendicular to the longitudinal axis of the sheath.

Such an arrangement makes it possible to reduce the width size of the sharpening device.

According to an advantageous feature of the invention, the sharpening device is arranged adjacent to the access opening.

Such a feature enables the blade to be sharpened over substantially the full length inserted into the sheath.

According to an advantageous feature of the invention, the biasing means comprises a biasing spring, advantageously a coil spring, interposed between the arm and a cradle of the sheath.

Such a construction has the advantage of being simple and economical to produce.

According to an advantageous feature of the invention, the sheath comprises a cradle and a shell removably mounted on the cradle.

Such a feature makes it possible to simplify the cleaning of the interior of the sheath.

According to an advantageous feature of the invention, the arm comprises a first longitudinal end rotatably mounted on a cradle.

According to an advantageous feature of the invention, the sharpening device is rotatably mounted at a second longitudinal end of the arm.

According to an advantageous feature of the invention, the first longitudinal end is mounted pivotally on the cradle around a first axis and the sharpening device is mounted pivotally on the arm around a second axis, the first and second axes being parallel to one another.

BRIEF DESCRIPTION OF THE FIGURES

The purposes, aspects and advantages of this invention, according to the description given below of a particular embodiment of the invention presented by way of non-limiting example, will be better understood by referring to the attached drawings in which:

FIG. 1 is a perspective view of a sheath and a knife according to a particular embodiment of the invention, the knife being depicted outside the sheath;

FIG. 2 is an exploded view in perspective of the sheath of FIG. 1;

FIG. 3 is a perspective view of the sheath of FIG. 1 with the knife inserted into the sheath, the sheath in this figure being depicted without its external shell in order to allow visual access to the mechanism of the sheath;

FIG. 4 is a view in longitudinal cross-section of the sheath and knife in the position illustrated in FIG. 3;

FIG. 5 is a bottom view of the removable shell of the sheath;

FIG. 6 is another view in perspective of the sheath of FIG. 1 without its knife;

FIG. 7 is a cross-sectional view along line VII-VII of FIG. 4;

FIG. 8 is an exploded view in perspective of the sharpening device equipping the sheath of FIG. 1.

FIG. 9 is a longitudinal cross-sectional view of the sheath and knife of FIG. 1 in three positions: a) the knife inserted into the sheath, b) the knife in a lower position with compression of the spring, c) the knife partially outside the sheath.

FIG. 10 is a side view with the hands of the user positioned on the sheath and the knife according to the invention, in order to remove the knife.

Only those elements required in order to understand the invention have been depicted. In order to facilitate interpretation of the drawings, the same elements are labeled with the same references across all the figures.

It will be noted that, in this document, the terms "horizontal," "vertical," "lower," "upper," "top," "bottom," "front," "rear," "longitudinal" and "transverse" used to describe the sharpening device refer to this device when in use, when it is resting flat on its base.

FIGS. 1, 3 and 4 depict a sharpening sheath 1 and a kitchen knife 2 comprising a blade 20 intended to be stored in the sheath 1, the knife 2 conventionally comprising a handle 21 which projects outside the sheath 1 when the blade 20 is stored in the sheath 1.

According to FIG. 2, the sheath 1 comprises a cradle 3 and a shell 4 attached to one another, and advantageously produced from a plastic material. The cradle 3 and the shell 4 are elongated in shape defining a cavity 40 intended to receive the blade 20 of the knife 2 for the storage thereof, the sheath 1 having a rear end provided with an access opening 10 through which the blade 20 of the knife 2 may be inserted into the cavity 40. Upstream from the access opening 10, the shell 4 has a guiding skirt 41 that has walls that converge towards the access opening 10 and enable the point of the blade 20 of the knife 1 to be guided towards the access opening 10.

The cradle 3 includes a base 30 comprising a lower face intended to rest flat on a support and comprises a front end formed by a grill 31 that extends upward from the base 30 forming an angle of the order of 65° relative to the lower face of the base 30, the grill 31 closing the front end of the sheath 1 and advantageously being obtained from molding with a base 30.

The shell 4 is advantageously removably attached to the cradle 3 and has an inverted U-shaped transverse cross-section, visible in FIG. 5, comprising at each of the ends thereof a rib 42 engaging in a guide groove 32 made longitudinally in each of the sides of the base 30 of the cradle 3.

According to FIGS. 3 and 4, the shell 1 comprises a guide device of the upper part of the blade 20 of the knife 2, also called back of the blade 20, comprising a guide member 5 attached to the interior of the shell 4 at the curved portion thereof defining the top of the shell 4, the guide member 5 extending in the longitudinal axis of the sheath 1 from the open end of the sheath 1 to the grill 31 defining the front end of the sheath 1.

Preferably, the guide member 5 comprises an opening 51 in the vicinity of the front end thereof, in which a catch 45 borne by the shell 4 is engaged, visible in FIGS. 2 and 4, the front end of the guide member 5 comprising a head 52 which projects upwards and which is engaged in a suitable recess 44 made at the front end of the shell 4.

The insertion of the catch 45 into the opening 51 and the engagement of the head 52 in the recess 44 make it possible to removably attach the front end of the guide member 5 to the front end of the shell 4.

The guide member 5 is advantageously attached to the rear end of the shell 4 in a snap-on manner, the rear end of the guide 5 comprising a centering ring 50 elastically engaging between two locking clips 43 projecting on the edges of the access opening 10 of the shell 1.

As can be seen in FIG. 2, the head 52 of the guide member 5 is engaged longitudinally in an indentation 33 made at the upper end of the grill 31 when the shell 4 is placed onto the cradle 3, the head 52 comprising a lower face comprising a groove 53 in which a locking catch 34 arranged at the base of the indentation 33 is elastically engaged, enabling the shell 4 to be maintained in position on the cradle 3.

According to FIGS. 5 and 6, the centering ring 50 comprises an inverted V-shaped notch 54 providing the centering of the back in the blade 20 relative to the shell 4 when the blade 20 is inserted into the sheath 1.

The sheath 1 comprises, facing the centering ring 50, a sharpening device 6 advantageously borne by an arm 7 mounted pivotally on the cradle 3, the sharpening device 6 being biased towards the centering ring 50 by a biasing spring 8 acting on the arm 7. Preferentially, the arm 7 is movable in the plane of the blade 20 between a high position where the biasing spring 8 is fully deployed and a low position where the biasing spring 8 is fully compressed.

According to FIGS. 2 and 3, the arm 7 comprises a first end, called front end, mounted pivotally in the vicinity of the front end of the cradle 3, by means of a first axis 71 extending perpendicularly to the longitudinal direction of the cradle 3. In the particular embodiment illustrated in the figures, the first axis 71 is supported by two side walls 35 extending vertically on either side of the front end of the arm 7, said side walls 35 contributing to the rigidity of the connection between the base 30 and the grill 31.

The arm 7 comprises a second end, called rear end, on which the sharpening device 6 is preferentially mounted pivotally around a second axis 72 extending parallel to the first axis 71, the device capable of pivoting relative to the arm 7 over an angular range of at least 15° and preferably of the order of 30°.

In the example illustrated in the figures, the arm 7 comprises two side tabs 73 which project towards the rear of the arm 7 and between which the sharpening device 6 is arranged, the second axis 72 being advantageously formed by cylindrical studs of circular cross-section which project laterally at the sharpening device 6 and which are engaged in circular openings made in the side tabs 73.

As can be seen more specifically in FIG. 8, the sharpening device 6 comprises a U-shaped body supporting two sharpening elements 60 arranged so as to form a V in a projection plane perpendicular to the longitudinal axis of the sheath 1, that is to say, when the sharpening device 6 is viewed in the direction of insertion of the blade 20 into the access opening 10 of the sheath 1, the two sharpening elements 60 being offset on the longitudinal axis of the sheath 1 and each extending in a plane perpendicular to the longitudinal axis.

The two sharpening elements 60, advantageously consisting of two cylinders of ceramic material, are arranged in two receptacles 61 designed to maintain two sharpening elements 60 in a V-shaped arrangement, the device 6 comprising a slot 63 made between the two U-legs, freeing access to the space located between the two sharpening elements 60. The two sharpening elements 60 are immobilized by friction inside their receptacle 61 thanks to the support of a portion of the body of the sharpening device 6, not shown in the figures, against the end of the sharpening element 60. Thus, the sharpening elements 60 do not turn in their receptacles 61, where then slightly, when they are subject to the friction of the blade 20 during insertion or extraction thereof in the sheath 1.

In the particular embodiment illustrated in the figures, the biasing spring 8 is a coil spring arranged between the cradle 3 and the lower face of the arm 7, in the vicinity of the rear end of the arm 7. In order to ensure the holding of the biasing spring 8 between the arm 7 and the cradle 3, the cradle 3 comprises a cup 36 to hold the lower end of the biasing spring 8 and the lower face of the arm 7 comprises a cup 74 to hold the upper end of the biasing spring 8, the cup 74 facing the cup 36 when the arm 7 is brought towards the cradle 3.

Advantageously, the back of the blade 20 of the knife 2 comprises a safety indentation 22, preferably arranged in the vicinity of the handle 21 of the knife 2, in which a locking element 55 is engaged, consisting of the bottom of the notch 54 when the entirety of the blade 20 is inserted into the sheath 1, as illustrated in FIGS. 3 and 4. Such insertion of the locking element 55 into the safety indentation 22, under the thrust effect of the biasing spring 8 on the arm 7, enables the knife 2 to be longitudinally immobilized in a storage position in the sheath 1.

In FIG. 9, the knife is first depicted in immobilized position (first position 9*a*) with the locking element 55 engaged in the safety indentation 22. The knife is then depicted in the unlocked position (second position 9*b*), with the locking element 55 outside the safety indentation 22 and the biasing spring 8 compressed. The knife is then finally depicted in released position (third position 9*c*), with the locking element 55 free and the safety indentation 22 free, The operation of the sharpening sheath 1 will now be described.

When the user wishes to store the blade 20 of the knife 2 in the sheath 1 or to sharpen the latter, he brings the point of the knife 2 to face the lozenge shaped opening, visible in FIG. 6, formed by the notch 54 and by the two sharpening elements 60, then inserts the blade 20 of the knife 2 inside the sheath 1 by a longitudinal movement. During this movement, the back of the blade 20 is centered in the bottom of the V-shaped notch 54 when the cutting part of the blade 20 is centered by the V formed by the two sharpening elements 60.

This dual positioning of the cutting part of the blade 20 and of the back of the blade 20 makes it possible to obtain a sharpening angle that remains symmetrical and constant for the full length of travel of the blade 20 in the sheath 1, without need for the user to manually orient the blade 20. Thus, the symmetry of sharpening is guaranteed and the sharpening angles are equal on each side of the blade edge, which enables uniform and centered wear of the blade 20.

In addition, during this insertion or extraction of the blade 20 from the sheath 1, the pivoting movement of the arm 7 enables the sharpening device 6 to follow the profile of the cutting part of the blade 20, the sharpening device 6 exerting, under the effect of the biasing spring 8, a moderate pressure on the cutting part of the blade 20 when the point of the blade is inserted into the access opening 10 of the sheath 1, then a greater and greater pressure as the height of the blade 20 increases when the knife 2 is inserted into the sheath 1 (visible in FIGS. 9*b* and 9*c*). The strong friction between the cutting part of the blade 20 and the sharpening elements 60 causes the sharpening of the blade 20.

Finally, because the sharpening elements are placed one behind the other, in the direction of insertion of the blade 20, the possible oscillation of the sharpening device 6 relative to the second end of the arm 7 allows the sharpening elements 60 to remain in constant contact with the blade 20 and to remain correctly oriented relative thereto, which enables the sharpening of the blade 20 to be optimized.

When the blade 20 of the knife 2 is fully inserted into the sheath 1, the locking element 55 of the centering ring 50 is inserted into the safety indentation 22 made on the back of the blade 20, under the effect of the biasing spring 8. The knife 2 is then safely maintained in the sheath 1. In order to extract the knife 2 from the sheath 1, as illustrated in FIG. 10, the user must first exert a downward pressure on the handle 21 of the knife 2 in order to remove the locking element 55 from the safety indentation 22, then exert a pulling force on the handle 21 of the knife 2 in order to extract the blade 20. Such manipulation avoids any accidental dropping of the knife 2, which could occur for example when the sheath 1 is handled in transport.

Moreover, the sheath 1 thus produced also has the advantage of allowing easy cleaning of the interior of the sheath 1. Indeed, the user can easily disengage the shell 4 from the cradle 3 by holding the cradle 3 in one hand, after having removed the knife 2, then by exerting a pulling force on the shell 4 such that the groove 53 is disengaged by elastic deformation of the head 52 from the locking catch 34 arranged at the top of the grill 31. He can then slide the shell 4 over the cradle 3, each guide groove 32 of the cradle 3 having, on the access opening 10 side, an open longitudinal end allowing the extraction of the rib 42 from the shell 4. After having cleaned the interior of the sheath 1, he may remount the shell 4 onto the cradle 3 by performing the operations described above in reverse order.

Of course, the invention is in no way limited to the embodiment described and illustrated, since this embodiment was only provided by way of example. Changes can still be made, particularly with regard to the constitution of the various elements or by substituting technical equivalents, without departing from the scope of protection of the invention.

Thus, in an alternative embodiment not shown, the shell may not be removable from the cradle, the cradle and the shell of the sheath being for example produced as one part.

Thus, in an alternative embodiment not shown, the safety indentation may be replaced by a safety element projecting onto the back of the blade and cooperating with a locking indentation made on the upper part of the sheath.

The invention claimed is:

1. A combination of a sheath and a knife comprising:

a blade of the knife configured to be stored in the sheath, wherein the sheath comprises a cavity configured to receive the blade and an access opening at one end of the cavity;

the sheath comprising, in a lower part thereof, a device for receiving a cutting edge of the blade, wherein the sheath comprises, in an upper part thereof, a locking element cooperating with a safety element made on a back of the blade to longitudinally immobilize the knife in the sheath and wherein the device for receiving the cutting edge of the blade is borne by an arm rotatably mounted in the sheath, the sheath having a spring-like element configured to act on the arm to push the device for receiving the cutting edge of the blade towards the locking element, wherein the sheath comprises a guide device for the back of the blade arranged proximate to the access opening, wherein the guide device comprises a notch for receiving the back of the blade, and wherein the locking element includes a bottom of the notch.

2. The combination according to claim 1, wherein the locking element and the safety element are arranged in such a way that the locking element is engaged in the safety element and immobilizes the knife in a storage position in which the entirety of the blade is inserted into the sheath.

3. The combination according to claim 2, wherein the safety element includes an indentation.

4. The combination according to claim 1, wherein the notch for receiving the back of the blade is in a shape of a V.

5. The combination according to claim 1, wherein the device for receiving the cutting edge of the blade includes a sharpening device.

6. The combination according to claim 5, wherein the sharpening device is rotatably mounted on the arm.

7. The combination according to claim 6, wherein the sharpening device comprises two sharpening elements arranged as a V.

8. The combination according to claim 7, wherein the two sharpening elements are arranged in two offset planes parallel to each other and perpendicular to a longitudinal axis of the sheath.

9. The combination according to claim 5, wherein the sharpening device is arranged adjacent to the access opening.

10. The combination according to claim 1, wherein the spring-like element comprises a return spring, interposed between the arm and a cradle of the sheath.

11. The combination according to claim 1, wherein the sheath comprises a cradle and a shell removably mounted on the cradle.

* * * * *